United States Patent [19]

Karklys

[11] 4,001,599
[45] Jan. 4, 1977

[54] APPLIANCE PROGRAMMER WITH INTEGRATED CIRCUIT

[75] Inventor: Joseph Karklys, St. Joseph, Mich.

[73] Assignee: Whirlpool Corporation, Benton Harbor, Mich.

[22] Filed: Sept. 17, 1974

[21] Appl. No.: 506,838

[52] U.S. Cl. .............................. 307/141; 328/130; 134/57 D; 134/58 D; 307/293

[51] Int. Cl.² .................. H01H 7/00; H01H 43/00

[58] Field of Search ............ 307/141, 141.4, 141.8, 307/293; 134/57 D, 58 D; 259/1; 340/309.1, 309.4; 328/130, 48–50

[56] References Cited
UNITED STATES PATENTS

| | | | |
|---|---|---|---|
| 3,774,056 | 11/1973 | Sample et al. | 307/141 |
| 3,840,752 | 10/1974 | Eshraghian | 307/141 |

Primary Examiner—David Smith, Jr.
Attorney, Agent, or Firm—Hill, Gross, Simpson, Van Santen, Steadman, Chiara & Simpson

[57] ABSTRACT

An appliance programmer, in particular an automatic washer programmer, employs a memory circuit and sequence control for establishing a predetermined program. The program may be altered by two techniques. A first technique includes the utilization of a circuit for sampling the circuit connections of the programmer so that any number of steps of the program can be varied to alter the entire program. This technique provides for the manufacture of an integrated circuit to establish a predetermined program and application of that circuit in a variety of appliances with different program requirements. A second technique utilizes operator control switches for manually altering the program and includes apparatus for locking out program modifications after a predetermined time interval at the initiation of program selection.

8 Claims, 5 Drawing Figures

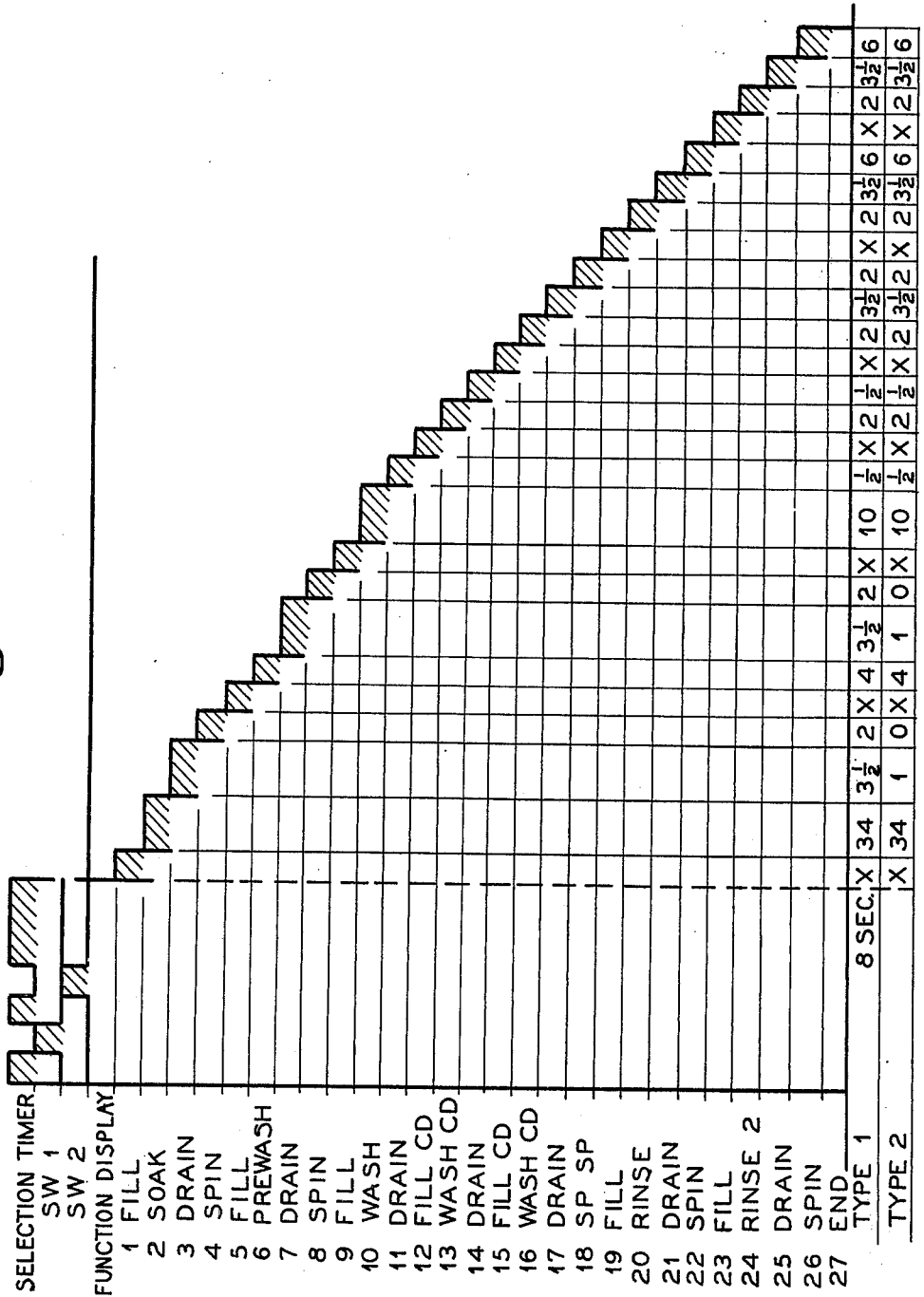

APPLIANCE PROGRAMMER WITH INTEGRATED CIRCUIT

CROSS-REFERENCE TO RELATED APPLICATION

This application is related to my copending application Ser. No. 506,792 filed on even date herewith.

BACKGROUND OF THE INVENTION

1. Field of the Invention

This invention relates to an appliance programmer, and is more particularly concerned with techniques for altering a predetermined program of appliance operations.

2. Description of the Prior Art

U.S. Pat. No. 3,662,186, assigned to Whirlpool Corporation, discloses a programmer for an appliance, in particular a dishwasher, in which manual switches may be selectively operated to alter the operation of the appliance. However, this patent does not disclose the use of a universal integrated circuit having certain inputs which may be sampled at the beginning of the program to automatically alter the program.

Sampling techniques per se are old in the art, as will be recognized by reference to U.S. Pat. No. 3,564,429 wherein input lines are sampled to establish the sampling rate of an oscillator.

Electronic timers and resettable clocks are also well known in the art as evidenced by the aforementioned U.S. Pat. No. 3,662,186 and by U.S. Pat. No. 3,639,844 and 3,702,030.

SUMMARY OF THE INVENTION

An object of the present invention is to provide for the manufacture of a universal circuit which establishes a predetermined program of appliance operations and which may be utilized in appliances having different program requirements by the simple expediency of connecting certain terminals to predetermined potentials, or by simply leaving these terminals unconnected.

Another object of the invention is to provide a universal programmer circuit, as set forth above, which includes circuits for scanning certain terminals to determine whether these terminals are connected to predetermined potentials.

According to the invention, an appliance programmer, herein disclosed in the environment of an automatic washer, comprises a clock for supplying electrical pulses at discrete time intervals, a sequence control for establishing a sequence of appliance operations and a memory circuit connected to the clock and to the sequence control for providing a sequence of output signals corresponding to the desired program.

The memory circuit includes an input memory for receiving program modification instructions from a plurality of operator controlled switches, a read only memory for generating the output signals, and an input encoder for encoding the information received from the input switches via the input memory to operate the read only memory.

Automatic program modification means is provided in the form of a program change command which is also connected to the input encoder. The program change command comprises a one shot flip-flop connected to and operated by the clock prior to initiation of the program. The flip-flop is connected to one input of an AND gate whose other inputs remain unconnected to indicate no change of program or are connected to a predetermined potential, such as ground, to indicate an automatic change of program. The one shot flip-flop in conjunction with the AND gate therefore scans the other inputs of the AND gate to determine if an automatic program change is to be made. The AND gate is connected to a latch circuit which stores the automatic program change information prior to initiation of the program.

A plurality of OR gates are connected to receive respective electrical pulses at predetermined times from the clock to cause termination of certain appliance operations by feeding corresponding information to the input encoder. A plurality of AND gates, however, are interposed between the latch circuit and respective OR gates to cause termination of the same operations at different times than established by the predetermined program when automatic program modification has been sensed by the scanning of the one shot flip-flop in conjunction with the first-mentioned AND gate.

BRIEF DESCRIPTION OF THE DRAWINGS

Other objects, features and advantages of the invention, its organization, construction and operation will be best understood from the following detailed description taken in conjunction with the accompanying drawings, on which:

FIG. 5 is a program chart illustrating a predetermined program and program modification in accordance with the principles of the present invention.

DESCRIPTION OF THE PREFERRED EMBODIMENTS

Figure 1:
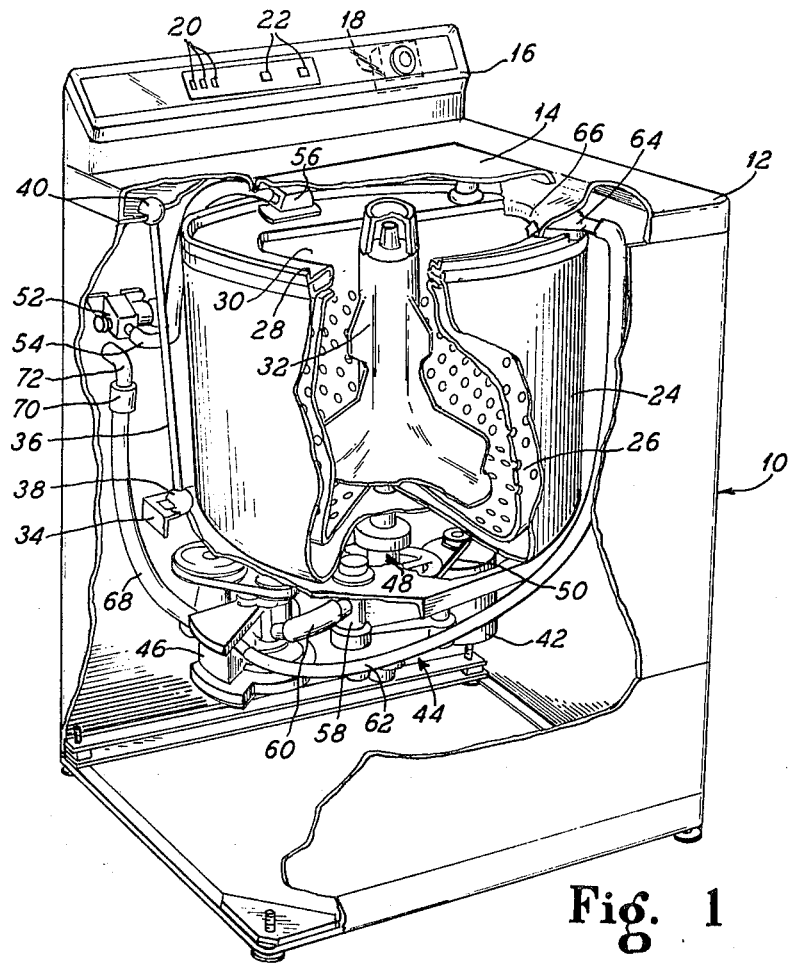
FIG. 1 is a perspective cut away view of an automatic washer which may embody the programmer of the present invention.

The automatic washer, as illustrated in FIG. 1, comprises a cabinet 10 including a cabinet top 12 having a lid 14 and a console 16. The console 16 is provided with a programmer 18, a plurality of operator controls 20, and a plurality of indicator lamps 22 to control and monitor the operation of the washer. The operations controlled by the programmer include a washing operation in which the clothes are agitated to remove soil, a draining operation in which the washing liquid is removed from the machine and a spinning or extraction operation in which the clothes are centrifuged to remove more liquid from the fabric.

A tub 24 has a concentric perforate basket 26 therein for receiving clothes to be washed. A tub ring 28 is provided to prevent splash from the washing action from flowing over the top of the tub. The tub ring 28 is provided with an opening 30 through which clothes are received into the basket 26. An agitator 32 is provided within the basket 26 to impart a washing action to the clothes.

The tub 24 is supported by a base plate 34 which is suspended from the cabinet 10 by three suspension rods, rod 36 being the only such rod illustrated. The rod 36 is connected to the base plate 34 by a resilient member 38 and to the cabinet 10 by a resilient member 40.

A motor 42 and a transmission 44 are suspended from the base plate 34 and provide a means of driving the agitator 32 and the basket 26. A valve pump 46 is provided to circulate the washing liquid during the washing operation and to remove the liquid from the tub 24 during the draining and spinning operations. A clutch and brake assembly indicated at 48 allows for engagement of the agitator 32 for oscillatory motion during the washing operation, while holding the basket 26 stationary, and for disengagement of the agitator 32 and engagement of the basket 26 for spinning of the basket during the spinning operation. The transmission 44, the pump 46, and the clutch and brake assembly 48 are driven by the motor 42 by means of a drive belt 50.

Water flows into the machine through a programmer controlled solenoid valve 52, through a conduit 54 and an antisyphon device 56 into the tub 24. During the washing operation, washing liquid is circulated from the tub 24 by suction from the valve to pump 46 through a button trap 58 and a conduit 60, and is pumped through a conduit 62 to a filter 64. The water flows through the filter where particles, such as lint, are removed and the filtered water flows through the discharge end of the filter into the basket 24 through the tub ring opening 30. The filter is mounted through a vertical flange 66 of the top 12 so as to overhang the opening 30. During draining of the tub 24, the pump valve is operated and wash liquid flows from the tub 24 through the button trap 58 and the conduit 60 to the pump 46. The wash liquid is then pumped through a conduit 68, a check valve 70 which allows flow of liquid in this direction only, and a conduit 72 to a drain (not shown).

Figure 2:
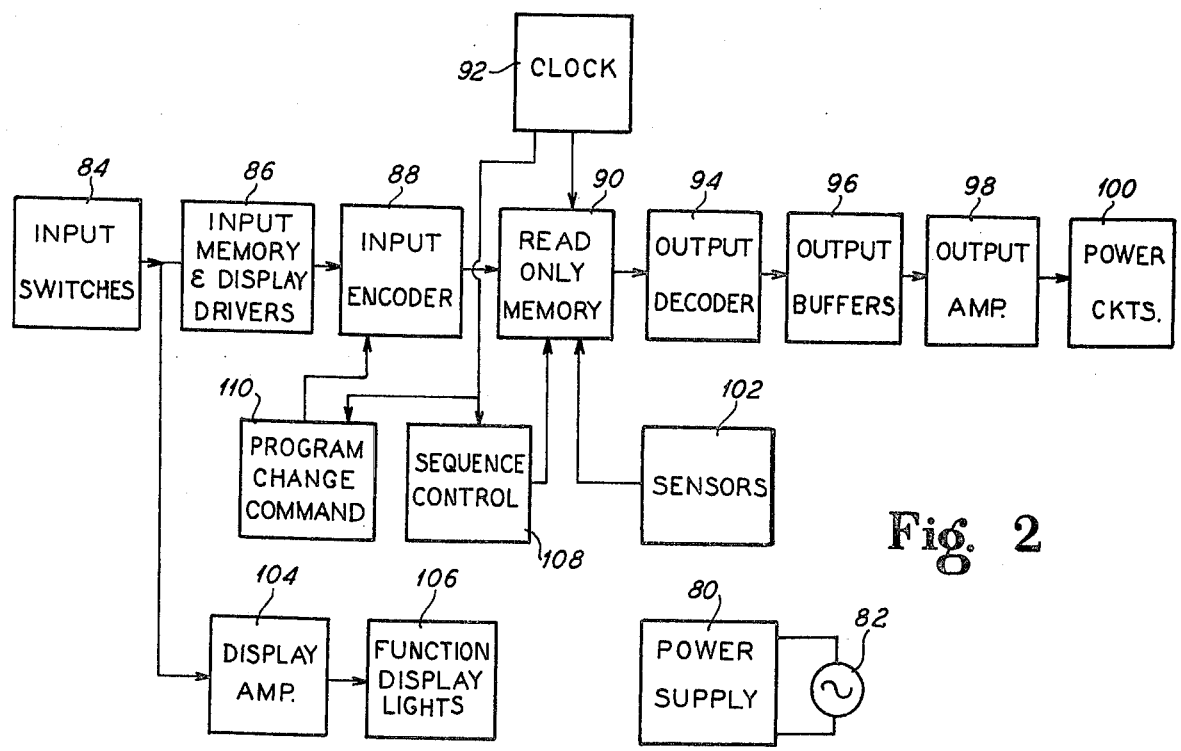
FIG. 2 is a schematic block diagram of a programmer constructed in accordance with the present invention.

Referring to FIG. 2, a schematic block diagram of the programmer 18 is generally illustrated as comprising a power supply 80 which is connected to a commercial electrical supply 82, such as 125 VAC, 60 Hz. The individual power connections to the individual circuits have been omitted for the sake of clarity. It is, however, well known in the art to derive timing pulses and establish a programming sequence with clocked pulses derived from a commercial line supply.

The program comprises a number of program steps which are set forth at the left-hand side of FIG. 5 and which consist of filling, washing, draining and spinning functions. An operator may elect to eliminate certain ones of these steps and for this purpose, several operator switches 84 are provided which, when depressed, will alter the basic cycle as shown in FIG. 5. The switches 84 are connected to an input memory and display driver circuit 86 which stores the information regarding the desired program modification. The input memory is connected to an input encoder 88 which provides a specified output for certain combinations of inputs. By way of example, the input encoder may comprise a number of AND gates. The information from the input encoder is provided to a read only memory 90 which, by way of example, may comprise a matrix. The matrix provides outputs only for a predetermined number of inputs, as is well known in the art. Therefore, for example, when a specific input switch has been depressed and a sequence control 108 provides a certain output, and a clock 92 provides a clock pulse, the read only memory 90 will provide a specified output to an output decoder 94. The output decoder 94 is connected by way of output buffers 96 and output amplifiers 98 to a plurality of power circuits 100, hereinafter called output circuits which perform the various operations of the program, including the opening and closing of the valves for filling and draining and shifting for agitation and spin.

The sequence control 108 is provided for establishing the sequence of steps in the operating cycle of the appliance as illustrated in FIG. 5. This sequence control can be constructed similar to that illustrated in the aforementioned U.S. Pat. No. 3,662,186.

The read only memory also receives inputs from sensors 102 such as, for example, a water level switch which indicates that a desired water level has been established within the tub 24. As mentioned above, the read only memory provides an output to an output decoder which decodes the information of the read only memory and feeds the same to output buffers from which the information is routed to the output amplifiers and the power circuits which operate the appliance.

The automatic washer can also be provided with function display lamps (not shown) connected in the circuit beyond the decoding operation to indicate the progression of the washing program.

In the embodiment illustrated in FIG. 2, function display lights 106 are energized by a display amplifier 104 which receives its input from the display drivers associated with the input memory, referenced 86. The display lights 106 may advantageously comprise light emitting diodes, although other types of display lights may also be used. The function of display lights 106 is to indicate which machine functions have been selected by the operator by means of the input switches. The display lights may also be used to indicate the progression of the washing program.

So far the description hereinabove has only been concerned with circuits which are well known in the art. New techniques for altering the predetermined program are set forth below with specific reference to FIGS. 3-5, for the inventions claimed in this and my aforementioned co-pending application.

Figure 3:
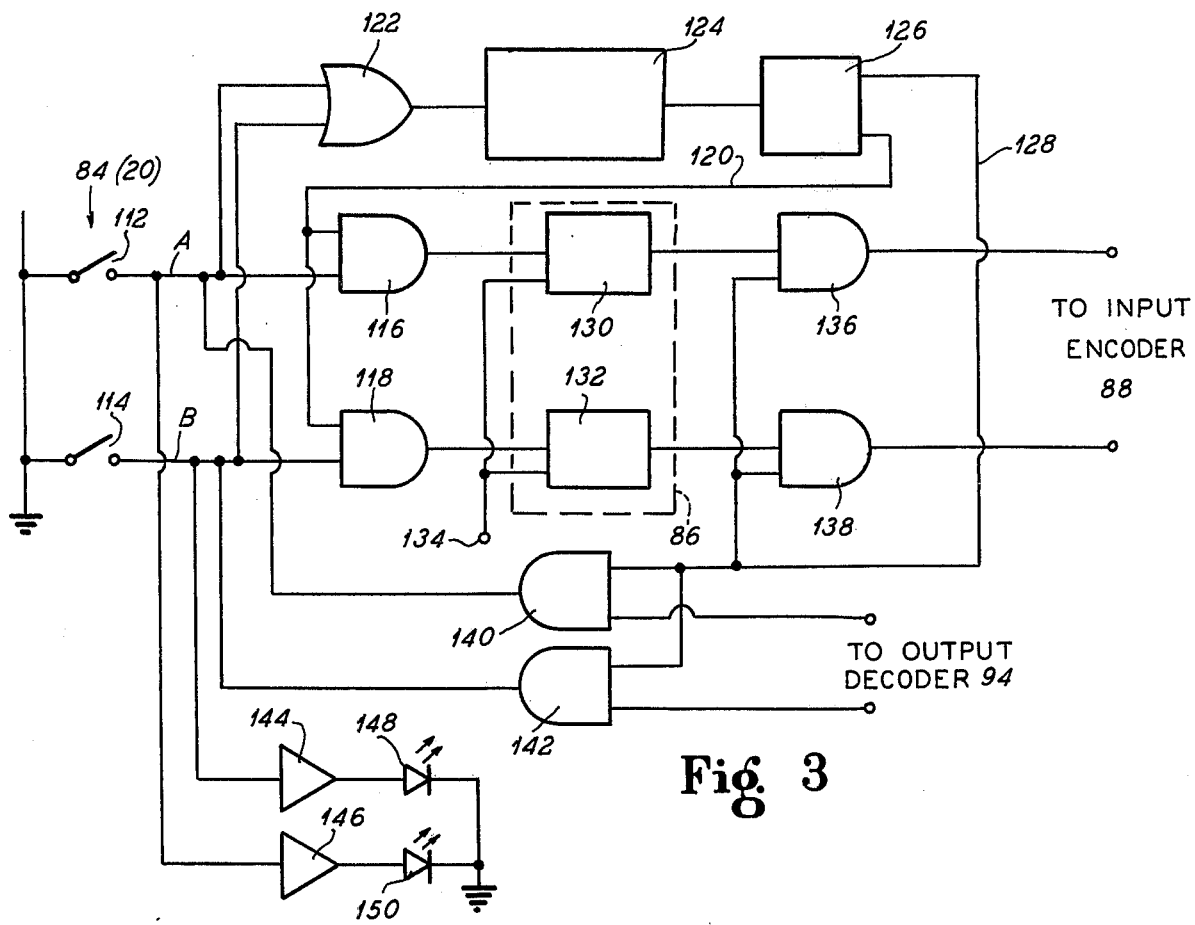
FIG. 3 is a schematic logic diagram of an operator controlled program modification circuit which may be employed in the circuit of FIG. 2.

Referring to FIG. 3, apparatus for operator controlled manual alteration of the program at the beginning of a cycle is illustrated. The purpose of this structure is to allow the operator a specified amount of time in which to modify the basic program and exercise available program options. Once that amount of time elapses, the programmer will lock out any further options selected by the operator. Each time the operator selects another option within the specified time, a clock is reset and begins counting toward the specified amount of time.

In FIG. 3 the input switches 84 have been illustrated in detail as comprising a pair of switches 112 and 114 which may be inexpensive momentary switches and which may be depressed by the operator to select specific types of options. By way of example, the operator may elect to skip specific steps in the program illustrated in FIG. 5. By depressing the switches 112 and 114, respective inputs are applied to a pair of AND gates 116 and 118. The other inputs of these AND gates are connected to a flip-flop 126 and until a reset pulse is received by the flip-flop 126 an output will appear which is fed to the gates 116 and 118. Therefore, the gates 116 and 118 will produce an output which is fed to a pair of latch or memory circuits 130 and 132. These latches represent the input memory 86 of FIG. 2 and include a "clear" input 134 which is energized at the beginning of the program cycle. This may be a reset pulse from the clock, such as by way of a single shot flip-flop.

The outputs of the latches are provided to two AND gates 136 and 138, which also receive inputs from the reset side of the flip-flop 126 by way of a connection 28.

The switches 112 and 114 are also connected to an OR gate 122, which provides a pulse to a timer 124 whenever one of the switches 112, 114 is actuated. Therefore, the timer is reset each time one of the switches is actuated. If the timer is not reset for a period of 8 seconds, for example, the timer will provide an output pulse which will reset the flip-flop 126 and remove the inputs supplied thereby to the AND gates 116 and 118 so that any further actuations of the switches 112 and 114 are locked out.

At this time, however, the AND gates 136 and 138 are opened by the signal on the reset output 128 of the flip-flop 126 to provide respective output pulses to the input encoder 88.

The input encoder 88 processes this information to alter the basic program of the appliance. The flip-flop 126 also provides inputs for a pair of AND gates 140 and 142 which receive respective inputs from the output decoder 94 corresponding to the altered sequence. The gates 140, 142 drive the light emitting diodes 148 and 150 by way of respective amplifiers 144 and 146 to indicate progression of the altered program.

It should be noted that the light emitting diodes 148 and 150 are energized by way of circuit connections of the integrated circuit which include portions A and B which are shared with the connections of the operator switches 112 and 114.

Figure 4:
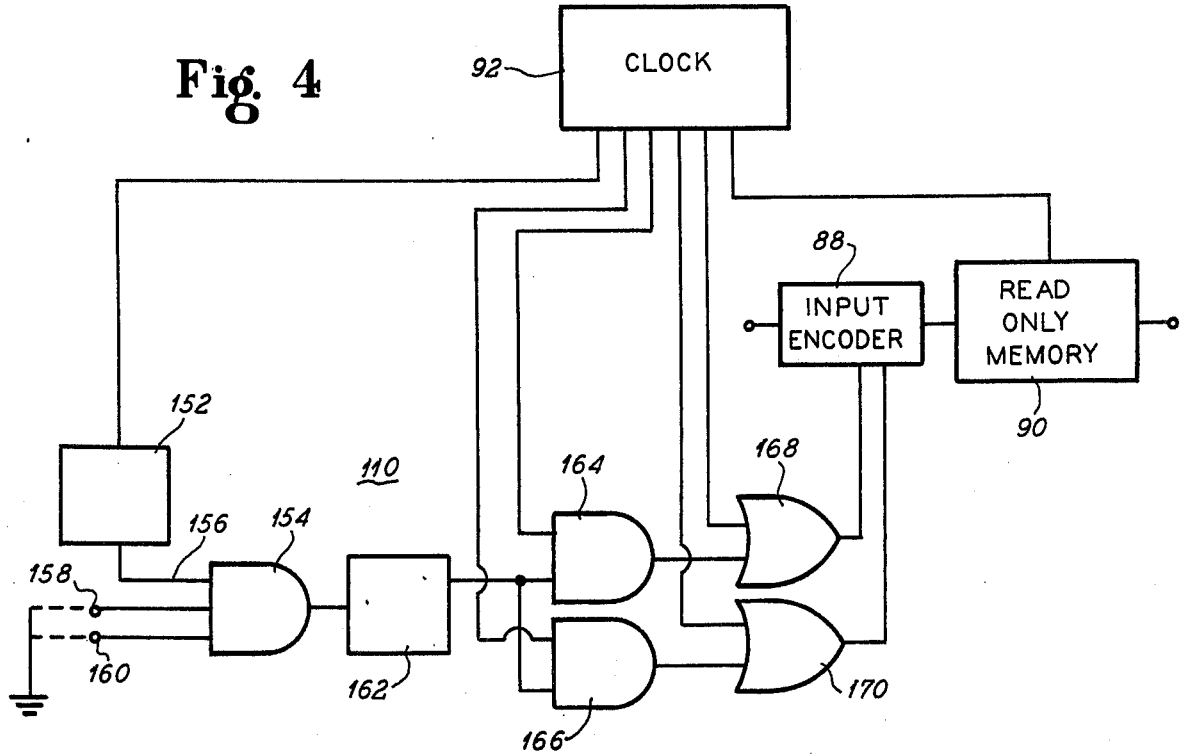
FIG. 4 is a schematic logic representation of a program change command circuit which may be employed in the circuit of FIG. 2.

Referring to FIG. 4, a program change command 110 is illustrated in detail as connected to the clock 92, the input encoder 88 and the read only memory 90. More specifically, the clock 92 has one output connected to a single shot flip-flop 152 which is in turn connected to an AND gate 154 at an input 156 of the AND gate, the AND gate 154 having other inputs 158 and 160 which are illustrated as connected to ground by means of broken lines. If it is desired to utilize a first type of program, these lines may be left unconnected or may be connected to a first source of reference potential; however, when a second type of program is desired, the inputs 158 and 160 are connected to ground, or to a second source of reference potential.

As to the difference between a first type of program and a second type of program, reference may be taken to FIG. 5 in which two types of programs are illustrated. In FIG. 5 it is shown that steps 3, 4, 7 and 8 vary between the programs referenced "type 1" and "type 2." Therefore for the first type of program 3½ minutes of drain are shown in step 3, whereas only 1 minute is shown for the second type of program. As another example, the first program has 2 minutes of spin in step 4; whereas, no time has been allotted for spin in the same step of the second program. Similarly, for the first program step 8 includes 3½ minutes for drain; whereas, on drain time has been allocated for the second type of program. Of course, other changes could be incorporated as desired.

In FIG. 4, the inputs 158 and 160 of the AND gate 154 may be terminals of an integrated circuit which is provided as a universal circuit for a variety of machines which have different programming requirements. When the integrated circuit is used in a "type 1" appliance, the terminals may be left unconnected; whereas for a "type 2" appliance, the terminals are connected to ground or some other suitable voltage source. At the beginning of each program, the type of connection of these terminals will be sampled by the programmer and the program which is utilized will be based on the results which are detected by the sampling mechanism. Therefore, in FIG. 4 a single shot flip-flop 152 is energized when the appliance is first turned on. The AND gate 154 will therefore provide an output only when the terminals 158 and 160 are connected to ground. This output is fed to a latch 162 whose output is, in turn, fed to a pair of AND gates 164 and 166.

The AND gates 164 and 166 receive inputs from the clock 92 in the form of respective unique electrical pulses. Therefore, and with reference to FIG. 5, the AND gate 166 may receive a clock pulse very shortly after initiation of the program cycle, for instance, 16 milliseconds after initiation of the cycle. The gate 164 may receive a pulse from the clock 1 minute after the initiation of the cycle. The outputs of the AND gates 164 and 166 are connected to respective OR gates 168 and 170. The OR gate 168, in this particular example, controls the drain function and the OR gate 170 controls the spin function. The OR gates 168 and 170 also receive inputs from the clock as illustrated in FIG. 4. Therefore, assuming that an output is provided by the AND gate 164 after 1 minute of operation of the cycle, then the OR gate 168 will provide an output to the input encoder 88 to terminate the drain function after 1 minute of operation. Similarly, when an output is provided by the AND gate 166 very shortly after initiation of the cycle, the OR gate 170 will provide an output to the input encoder 88 to all of the programs so as to eliminate the spin step 4. However, when no output is provided from the AND gates 164 and 166, the clock pulses fed to the OR gates 168 and 170 control the drain and spin steps 3 and 4. Therefore, it can be seen that additional OR gates may be provided to alter the basic machine program so that the simple technique of selective wiring of terminals of the integrated circuit provides the manufacturer with universality of the circuit and flexibility in utilizing the circuit in machines having different program requirements.

Looking back then, the programmer set forth herein, and in my aforementioned copending application, is provided with a basic program whose sequence of operations is defined by a sequence of output signals from a read only memory under the control of a sequence control circuit. This basic program may be automatically altered by a program change command circuit which is incorporated in the programmer circuit and which scans certain terminals of the circuit to determine the particular program application of the circuit. This automatic altering of the program, in effect, provides the particular appliance in which the circuit is incorporated with its own unique basic program as far as the operator of the appliance is concerned. The operator of the appliance is, however, provided with additional flexibility in utilizing the appliance through the provision of switches for selectively altering this unique basic program. Therefore, the programmer disclosed herein provides both the manufacturer and the consumer with programming flexibility through simple, yet effective, techniques.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

Having described the invention, the embodiments of the invention in which an exclusive property or privilege is claimed are defined as follows:

1. In an appliance which performs a plurality of operations, an electronic control for stepping the appliance through an operating program which comprises a sequence of the operations, said electronic control comprising:
 a clock having a plurality of outputs for supplying electrical timing pulses at a plurality of discrete intervals;
 a sequence control connected to said clock for establishing a sequence of operations, the timing of said operations being controlled by selected timing pulses;
 a memory circuit connected to said sequence control and to said clock for generating a sequence of output signals;
 a plurality of output circuits connected to said memory circuit for performing said sequence of operations in response to said sequence of output signals;
 a source of reference potential and at least a single terminal for connection thereto;
 program modifying means connected to said clock and said terminal and having an output connected to said memory circuit, said program modifying means comprising gating means which is enabled at the start of the program to be responsive to the electrical potential at said terminal to pass a timing pulse from one of said clock outputs to the memory circuit, said timing pulse operating on said memory circuit in place of one of said selected timing pulses.

2. An appliance according to claim 1, wherein said program modifying means includes
 an AND gate having an output and a plurality of inputs,
 a single shot flip-flop connected to one of said inputs and connected to and operated by said clock prior to initiation of the program, the remainder of said inputs of said AND gate being connected to a first predetermined potential to indicate a program modification and to a second predetermined potential to indicate that a modification is not to be made,
 a latch circuit connected to and operated by said AND gate, and
 means connected to said latch circuit, to said clock and to said memory circuit for modifying the program in response to a true state of said AND gate.

3. An appliance according to claim 2, wherein the last-mentioned means includes
 a plurality of AND gates each having an output and each having an input connected to said latch circuit and each having an input connected to receive a respective electrical pulse from said clock, and
 a plurality of OR gates each having an output connected to said memory circuit, an input connected to receive a respective electrical pulse from said clock and an input connected to an output of a gate of said plurality of AND gates, each of said OR gates responsive to said clock pulses to cause termination of certain operations in accordance with the established program and responsive to said plurality of AND gates to cause termination of the same operations in accordance with the automatically modified program.

4. In a laundry appliance which performs a plurality of laundry operations in a treatment zone, an electronic control for stepping the laundry appliance through an operating program which comprises a sequence of the laundry treatment operations, said electronic control comprising:
 a clock for supplying electrical pulses at a plurality of discrete time intervals;
 a sequence control for establishing a sequence of the laundry operations, said pulses controlling the durations of said operations;
 a memory circuit connected to said sequence control and to said clock for generating a sequence of output signals;
 a plurality of output circuits connected to said memory circuit for performing said sequence of laundry operations in response to said sequence of output signals; and
 program modifying means connected to said memory circuit including means for sensing the electrical condition of selected circuit connections which are connected to a source of reference potential and means enabled by said sensing means to pass selected clock pulses to thereby control certain of said operations, whereby the sequence of laundry operations is automatically modified in accordance with the sensed electrical reference potentials at said circuit connections.

5. An appliance according to claim 4, wherein said memory circuit comprises:
 a read only memory for generating said output signals;
 an input encoder connected to said read only memory;
 an input memory connected to said input encoder; and
 a set of operator controls connected to said input memory for modifying the established sequence of operations, said program modifying means connected to said input encoder to cause automatic modification and operator modification of the established program to be reflected by said read only memory.

6. A laundry appliance according to claim 4, wherein said program modifying means comprises
 first gate means connected to said circuit connections to sense the electrical potentials thereon, and
 second gate means connected to said first gate means and to said memory circuit for modifying the established sequence in accordance with the potentials sensed by said first gate means.

7. A laundry appliance according to claim 4, wherein said program modifying means includes
 an AND gate having an output and a plurality of inputs, a single shot flip-flop connected to one of said inputs and connected to and operated by said clock prior to initiation of the program, the remainder of said inputs being connected to a predetermined potential to indicate a program modification and unconnected to indicate that automatic modification is not to be made,
 a latch circuit connected to and operated by said AND gate, and means connected to said latch circuit, to said clock and to said memory circuit for modifying the program in response to a true state of said AND gate.

8. A laundry appliance according to claim 7, wherein the last-mentioned means includes a plurality of AND gates each having an output and each having an input connected to said latch circuit and each having an input connected to receive a respective electrical pulse from said clock, and a plurality of OR gates each having an output connected to said memory circuit, an input connected to receive a respective electrical pulse from said clock and an input connected to an output of a gate of said plurality of AND gates, each of said OR gates responsive to said clock pulses to cause termination of certain operations in accordance with the established program and responsive to said plurality of AND gates to cause termination of the same operations in accordance with the automatically modified program.

* * * * *